US011230655B2

(12) United States Patent
Nalewajek et al.

(10) Patent No.: US 11,230,655 B2
(45) Date of Patent: *Jan. 25, 2022

(54) HFO-1234YF INHIBITED SOLUTIONS

(71) Applicant: HONEYWELL INTERNATIONAL INC., Morris Plains, NJ (US)

(72) Inventors: David Nalewajek, West Seneca, NY (US); Rajiv Ratna Singh, Getzville, NY (US); Rajiv Banavali, Morristown, NJ (US); Gregory Laurence Smith, Niagara Falls (CA)

(73) Assignee: HONEYWELL INTERNATIONAL INC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,476

(22) Filed: Dec. 13, 2019

(65) Prior Publication Data

US 2020/0190380 A1 Jun. 18, 2020

Related U.S. Application Data

(60) Provisional application No. 62/911,987, filed on Oct. 7, 2019, provisional application No. 62/781,333, filed on Dec. 18, 2018.

(51) Int. Cl.
*C09K 5/04* (2006.01)

(52) U.S. Cl.
CPC ............... *C09K 5/04* (2013.01); *C09K 5/045* (2013.01)

(58) Field of Classification Search
CPC .................................. C09K 5/04; C09K 5/045
USPC ............................................. 252/67, 68, 69
See application file for complete search history.

(56) References Cited

U.S. PATENT DOCUMENTS

| 5,847,246 A * | 12/1998 | Hsu ........................ C09K 5/20 585/1 |
| 6,086,782 A * | 7/2000 | Hsu .......................... C09K 5/10 252/570 |
| 11,021,639 B2 * | 6/2021 | Nalewajek ............... C09K 5/45 |
| 2006/0022166 A1 * | 2/2006 | Wilson ............... C10M 171/008 252/68 |
| 2006/0043330 A1 * | 3/2006 | Wilson ..................... C08J 9/147 252/67 |
| 2010/0301259 A1 * | 12/2010 | Leek ....................... C09K 5/045 252/68 |
| 2013/0012419 A1 * | 1/2013 | Matsumoto ........ C10M 171/008 508/463 |
| 2013/0150519 A1 * | 6/2013 | Durali ...................... C08F 2/10 524/545 |
| 2017/0146265 A1 * | 5/2017 | Fujitaka ................. C09K 5/045 |
| 2017/0267906 A1 * | 9/2017 | Minor ..................... C09K 5/045 |
| 2017/0335230 A1 * | 11/2017 | Matsumoto .......... C10M 127/02 |
| 2018/0110689 A1 * | 4/2018 | Torres Rivera .......... A61K 8/69 |
| 2018/0110690 A1 * | 4/2018 | Torres Rivera ........ A61K 8/315 |
| 2020/0190331 A1 * | 6/2020 | Sarkas .................... C09K 15/08 |
| 2020/0190381 A1 * | 6/2020 | Nalewajek ............. C09K 5/045 |
| 2021/0040368 A1 * | 2/2021 | Peng ..................... C09K 5/045 |
| 2021/0108119 A1 * | 4/2021 | Peng ..................... C09K 5/045 |
| 2021/0269692 A1 * | 9/2021 | Ota ......................... F25B 13/00 |

FOREIGN PATENT DOCUMENTS

WO WO-2019213004 A1 * 11/2019 ............. C09K 5/045

OTHER PUBLICATIONS

"Terpinene", Wikipedia (English), Sep. 24, 2020, 4 pages. (Year: 2020).*

* cited by examiner

*Primary Examiner* — Douglas J Mc Ginty
(74) *Attorney, Agent, or Firm* — Colleen D. Szuch

(57) ABSTRACT

The present invention provides a composition comprising 2,3,3,3-tetrafluoropropene and α-terpinene particularly useful in automotive air conditioning systems and devices, commercial refrigeration systems and devices, chillers, residential refrigerator and freezers, general air conditioning systems, heat pumps, and the like.

9 Claims, 1 Drawing Sheet

19F NMR 1234yf Homopolymer Reference Std.
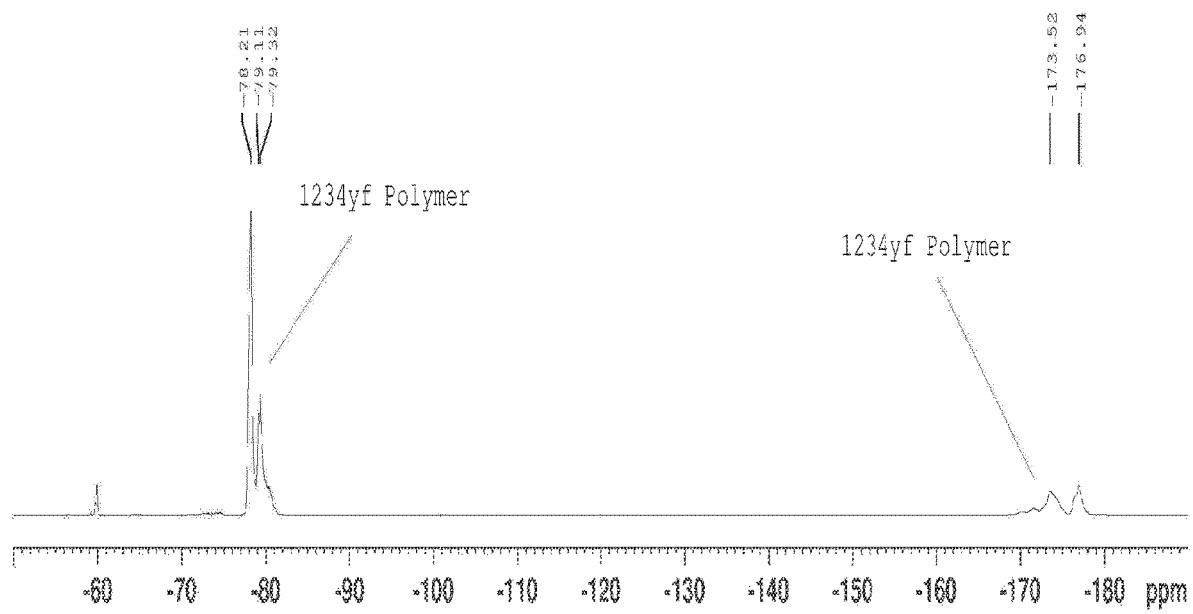
19F NMR 1234yf Std. Material
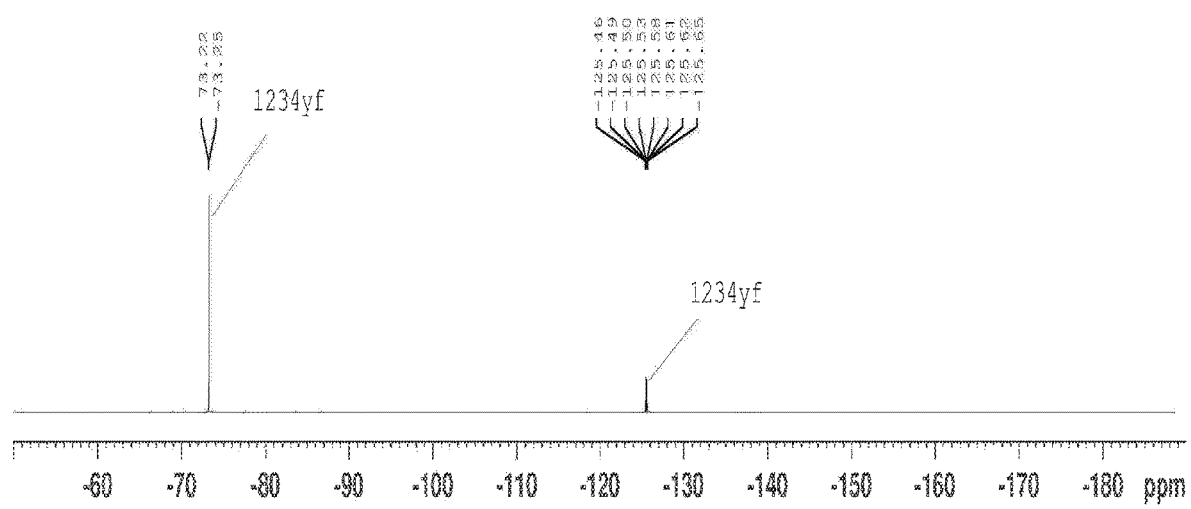

HFO-1234YF INHIBITED SOLUTIONS

CROSS REFERENCES TO RELATED APPLICATIONS

The present application claims the priority benefit of each of U.S. Provisional Application No. 62/911,987, filed Oct. 7, 2019, U.S. Provisional Application No. 62/781,333, filed Dec. 18, 2018, each of which is incorporated herein by reference in its entirety as if fully set forth below.

FIELD OF THE INVENTION

The present invention relates to compositions comprising 2,3,3,3-tetrafluoropropene (HFO-1234yf) and alpha-terpinene (referred to herein as "α-terpinene"). The present invention also relates to methods and uses of α-terpinene to stabilize compositions comprising HFO-1234yf against polymerization.

BACKGROUND OF THE INVENTION

In 1997, as concern grew over the human impact on climate change, the United Nations convened a conference in Kyoto, Japan. This resulted in the Kyoto Protocol which seeks to control the amount greenhouse gasses in the atmosphere "at a level that would prevent dangerous anthropogenic interference with the climate system".

For decades, certain perfluorocarbons ("PFCs"), chlorofluorocarbons ("CFCs"), hydrochlorofluorocarbons ("HCFCs"), and hydrofluorocarbons ("HFCs") have been used in a broad variety of industrial, commercial, consumer, and public use applications. Concern has now increased about potential damage to the earth's atmosphere and climate. The series of compounds listed above have been identified as particularly problematic at least in part due to their greenhouse gas effect and relatively high global warming potentials (hereinafter "GWP"). In view of the relatively high GWP of these compounds, there has been a vigorous search for alternative compounds of lower GWP than those listed above.

Under the terms of the Kyoto Protocol, the phase out of the materials listed above, even the HFCs, has been accelerated. In the continuing search for new fluorocarbon or hydrofluorocarbon alternatives that do not have an adverse effect on the environment but which have all the advantages of their predecessor molecules, focus has centered on the use of certain hydrofluoroolefins (hereinafter "HFOs") and certain hydrochlorofluoroolefins (hereinafter "HCFOs").

2,3,3,3-Tetrafluoropropene (HFO-1234yf) is a hydrofluoroolefin, which is useful in a variety of applications including: heat transfer uses such as refrigeration, air conditioning (especially automobile air conditioning), heat pumps, chillers, and organic Rankine cycle; foam blowing agents; and aerosol propellants. HFO-1234yf has been widely adopted to replace HFC-134a in a host of applications including automotive air conditioning.

Generally speaking, the carbon-carbon double bond present in HFOs and HCFOs makes these molecules more likely to undergo chemical reaction including during transportation, storage, handling or use than the predecessor saturated molecules such as the HFCs. Such undesirable reactions generally occur at lower temperatures than for HFCs and the rate of reactivity generally exceeds that of the HFCs at a given temperature. Given this and the variability of temperature during transportation, HFOs and HCFOs are at greater risk than HFCs for undergoing reaction during transport.

Generally speaking, HFO-1234yf does not undergo unwanted polymerization reactions during storage, handling or use as a refrigerant in heat transfer and other applications. However, applicants have come to appreciate that under certain circumstances, particularly during storage under certain conditions, HFO-1234yf can undergo polymerization reactions to an unwanted, undesirable and disadvantageous extent. In particular, as explained in more detail hereinafter, the containers or vessels which hold HFO-1234yf, particularly during certain storage conditions, can expose the HFO-1234yf to an increased likelihood of polymerization reactions. In particular, if the environment in the container/vessel exposes the HFO-1234yf to even small traces of contaminants that might act as a radical initiator (e.g., peroxides), an undesirable and detrimental extent/type of polymerization reaction(s) can occur insider the container/vessel. For example, the contamination of HFO-1234yf with peroxide contained in many thread sealants used with threaded valves in storage vessels can cause dramatically increased levels of HFO-1234yf polymerization reactions, and the presence of such HFO-1234yf polymers in the vessel or container can be a significant detriment.

As used herein, the terms "polymerization" and "HFO-1234yf polymers" refer to materials and reactions that include HFO-1234yf homo oligomers and oligomers of HFO-1234yf containing a heteroatom (hetero-oligomers), as well as polymers of HFO-1234yf. An exemplary hetero-oligomer of HFO-1234yf has the formula $[(CF_3)(F)-C-C-(H)(H)-O-]_x$. An exemplary polymer of HFO-1234yf has the following formula $[(CF_3)(F)-C-C-(H)(H)]_n$ where n>10. If oxygen becomes incorporated in the polymer, an exemplary polymer of HFO-1234yf has the following formula $[(CF_3)(F)-C-C-(H)(H)]_n$ $[(CF_3)(F)-C-C-(H)(H)-O-]_x$ where the ratio of n/x is 400 or greater. The molecular weight of the HFO-1234yf polymer to which the present invention is addressed ranges from about 250 to over a million Daltons. The oligomers typically have a molecular weight from about 250 to about 1,000 Daltons and the polymers have a molecular weight of greater than 1,000 to over a million Daltons. Some polymers have a molecular weight of from 10,000 to over a million Daltons or from 100,000 to over a million Daltons.

Accordingly, there is a need in the art for additives for HFO-1234yf which limit or avoid the formation of HFO-1234yf polymers products during transportation, storage, handling, and use of HFO-1234yf, but do not detract from the performance and environmental advantages associated with HFO-1234yf. Because the effectiveness of any additive for a specific molecule or composition is unpredictable, the skilled person would have no expectation that the prior art solutions (including stabilizers for specific HFO/lubricant pairs) would be effective for preventing the HFO-1234yf polymerization reactions and HFO-1234yf polymers being addressed according to the present inventions. It is well known that just because a particular additive is effective at stabilizing a particular class of molecules (e.g. saturated HFCs) from one type of unwanted reaction it does not mean that that additive will be effective with another class of molecules, like HFOs or to prevent another type of unwanted reaction. Similarly, just because an additive is effective for a particular HFO under a certain set of conditions (including what other materials that are present in the environment) does not mean that it will be effective for a different HFO and/or for a different HFO under a different set of conditions.

BRIEF DESCRIPTION OF THE DRAWING

FIG. 1 shows the NMR spectra for the monomer of HFO-1234yf and homopolymer of HFO-1234yf.

DESCRIPTION OF THE INVENTION

The applicants have found that α-terpinene can be used according to the teachings contained herein to effectively inhibit polymerization reactions of HFO-1234yf, and hence the production of disadvantageous levels of HFO-1234yf polymers, that may occur during the transportation, storage, handling, and use of HFO-1234yf, without interfering with the environmental properties and performance of HFO-1234yf.

In accordance with a first aspect of the present invention, there is provided a composition comprising HFO-1234yf and α-terpinene.

HFO-1234yf and α-terpinene

The compositions of the invention comprise HFO-1234yf and α-terpinene or consist essentially of HFO-1234yf and α-terpinene or consist of HFO-1234yf and α-terpinene.

In each of the compositions of the invention the α-terpinene is present in an amount of at least 1 parts-per-million ("ppm") by weight based on the amount of HFO-1234yf and α-terpinene present in the composition. Unless otherwise specifically indicated herein, "ppm" refers parts-per-million based on the weight of indicated components.

In preferred embodiments, the α-terpinene is present in an amount of from about 1 ppm to about 10,000 ppm, or from about 100 ppm to about 1000 ppm or from about 150 ppm to about 500 ppm, or from about 300 ppm to about 500 ppm in each case based on the amount of HFO-1234yf and α-terpinene present in the composition.

α-terpinene can be combined with the HFO-1234yf by any means known in the art. For example, α-terpinene can be added to HFO-1234yf by liquid transfer under ambient conditions using a metering pump and flow meter or via sub-atmospheric transfer (e.g. vacuum transfer) into an evacuated storage vessel prior to filling it with the HFO-1234yf, where the α-terpinene diffuses into the HFO-1234yf. The conditions under which α-terpinene is combined with the HFO-1234yf are not critical provided a substantially homogeneous combination of HFO-1234yf and α-terpinene is formed.

The compositions of the invention may be stored in any suitable container. These containers may be fitted with a threaded valve, where a sealant has been applied to the threads of the valve. The sealant used on the threads may contain a material that acts as a radical initiator when exposed to the HFO-1234yf, such as a peroxide, and in a particular example cumene hydroperoxide. Peroxides are radical initiators which may cause polymerization of HFO-1234yf. Other radical initiators that may cause the polymerization of HFO-1234yf include alkali metal persulfates. Exemplary peroxides include t-butylperoxypivalate or cumene hydroperoxide and exemplary alkali metal persulfates include sodium, potassium, or ammonium persulfates.

The unwanted HFO-1234yf polymerization products can include HFO-1234yf homo oligomers, HFO-1234yf hetero-oligomers and polymers of HFO-1234yf. The HFO-1234yf homo oligomer can have the formula $[(CF_3)(F)-C-C-(H)(H)-O-]_x$. The HFO-1234yf hetero-oligomer can have the formula $[(CF_3)(F)-C-C-(H)(H)]_n$ where n>10. The unwanted polymer of HFO-1234yf can have the formula $[(CF_3)(F)-C-C-(H)(H)]_n$ $[(CF_3)(F)-C-C-(H)(H-O-]_x$ where the ratio of n/x is 400 or greater.

Non-Volatile Residue or High Boiling Residue (NVR-Criteria)

The inhibiting effect of the additive of the invention can be measured by determining the formation of polymerization products measured as non-volatile residue (i.e., NVR), using the gravimetric determination option of Part 3 "Determination of High Boiling Residue in New and Reclaimed Refrigerants by Volumetric and/or Gravimetric Measurement and Determination of Particulate Residue by Visual Indication" according to AHRI Standard 700-2014—Normative, which incorporates and relies upon the 2008 version of Appendix C for Analytical Procedures (hereinafter "The NVR Test"). For the purposes of convenience, reference herein a quantitative value or range of values for "the NVR" of HFO-1234yf refer to the value as determined by the NVR Test as described in this paragraph.

The NVR of HFO-1234yf according to the present invention should not exceed 0.01 weight % (100 ppm), which is consistent with AHRI Standard 700-2017 with Addendum 1, Specification for Refrigerants. It is preferable that the compositions, methods and containers of the present invention have an NVR of HFO-1234yf that is less than or equal to 25 ppm, more preferably less than or equal to 15 ppm and still more preferably less than or equal to 10 ppm. It is most preferable that the compositions, methods and containers of the present invention have an NVR of HFO-1234yf less than or equal to 5 ppm.

In certain compositions, methods and containers of the invention, the NVR of HFO-1234yf is from about 5 ppm to about 15 ppm, while in certain other compositions of the invention, the compositions, methods and containers of the present invention have an NVR of HFO-1234yf from about 5 ppm to about 10 ppm and in still other compositions, methods and containers of the invention the NVR of HFO-1234yf is less than about 10 ppm. Applicants have come to appreciate that the NVR of HFO-1234yf should not exceed 0.01 weight % (100 ppm) after storage in a container or vessel at a temperature in the range of from about −10° C. to about 50° C. over the following periods: 30 days, at least 3 months or at least 6 months.

Applicants have further come to appreciate that, in the absence of the solution provided by the present invention, the HFO-1234yf polymer that is produced at the relatively low end of the above-noted temperature range, i.e., about −10° C., tends to be of particularly high molecular and particularly disadvantageous to use of the HFO-1234yf, and that invention as described herein is able to effectively inhibit the production of such polymers at such low temperatures. Accordingly, the compositions, methods and containers of the present invention have an NVR of HFO-1234yf that is not greater than 0.01 weight % (100 ppm) after storage in a container or vessel at a temperature of about −10° C. over a 30 day period.

The compositions, methods and containers of the present invention include those having an NVR of HFO-1234yf that is not greater than 0.01 weight % (100 ppm) after storage in a container or vessel at a temperature of about −10° C. over a 3 month period.

The compositions, methods and containers of the present invention include those having an NVR of HFO-1234yf that is not greater than 0.01 weight % (100 ppm) after storage in a container or vessel at a temperature of about −10° C. over a 6 month period.

The present invention includes compositions in which the NVR of HFO-1234yf is not greater than 0.01 weight % (100 ppm) after storage in a container or vessel at any temperature in the range of temperatures of from about −10° C. to about 50° C. over a 30 day period and/or over a over a 3 month period and/or over a 6 month period.

It is preferable that the NVR of HFO-1234yf is less than or equal to 25 ppm, more preferably less than or equal to 15 ppm and still more preferably less than or equal to 10 ppm after storage at up to 50° C. over any of the following periods: 30 days, at least 3 months or at least 6 months.

The present invention includes compositions in which the NVR of HFO-1234yf is less than or equal to 5 ppm after storage in a container or vessel at a temperature in the range of from about −10° C. to about 50° C. over a 30 day period.

The present invention includes compositions in which the NVR of HFO-1234yf is less than or equal to 5 ppm after storage in a container or vessel at a temperature in the range of from about −10° C. to about 50° C. over a 3 month period.

The present invention includes compositions in which the NVR of HFO-1234yf is less than or equal to 5 ppm after storage in a container or vessel at a temperature in the range of from about −10° C. to about 50° C. over a 6 month period.

The present invention includes compositions in which the NVR of HFO-1234yf is less than or equal to 5 ppm after storage in a container or vessel at a temperature of about −10° C. over a 30 day period.

The present invention includes compositions in which the NVR of HFO-1234yf is less than or equal to 5 ppm after storage in a container or vessel at a temperature of about −10° C. over a 3 month period.

The present invention includes compositions in which the NVR of HFO-1234yf is less than or equal to 5 ppm after storage in a container or vessel at a temperature of about −10° C. over a 6 month period.

The present invention includes compositions in which the NVR of HFO-1234yf is less than 5 ppm after storage in a container or vessel at any temperature in the range of temperatures of from about −10° C. to about 50° C. over a 30 day period and/or over a over a 3 month period and/or over a 6 month period.

The present invention includes compositions in which the NVR of HFO-1234yf is from about 5 ppm to about 15 ppm.

The present invention includes compositions in which the NVR of HFO-1234yf is from about 5 ppm to about 10 ppm.

The present invention includes compositions in which the NVR of HFO-1234yf is less than 10 ppm after storage in a container or vessel at a temperature in the range of from about −10° C. to about 50° C. over a 30 day period.

The present invention includes compositions in which the NVR of HFO-1234yf is less than 10 ppm after storage in a container or vessel at a temperature in the range of from about −10° C. to about 50° C. over a 3 month period.

The present invention includes compositions in which the NVR of HFO-1234yf is less than 10 ppm after storage in a container or vessel at a temperature in the range of from about −10° C. to about 50° C. over a 6 month period.

The present invention includes compositions in which the NVR of HFO-1234yf is less than 10 ppm after storage in a container or vessel at a temperature of about −10° C. over a 30 day period.

The present invention includes compositions in which the NVR of HFO-1234yf is less than 10 ppm after storage in a container or vessel at a temperature of about −10° C. over a 3 month period.

The present invention includes compositions in which the NVR of HFO-1234yf is less than 10 ppm after storage in a container or vessel at a temperature of about −10° C. over a 6 month period.

The present invention includes compositions in which the NVR of HFO-1234yf is less than 10 ppm after storage in a container or vessel at any temperature in the range of temperatures of from about −10° C. to about 50° C. over a 30 day period and/or over a over a 3 month period and/or over a 6 month period.

The compositions of the invention have broad applicability including in automotive air conditioning systems and devices, commercial refrigeration systems and devices, chillers, residential refrigerator and freezers, general air conditioning systems, heat pumps, and the like. The compositions of the invention are useful as foam blowing agents and propellants. The presence of α-terpinene in the compositions of the invention does not detract from the environmentally desirable properties or from the performance of HFO-1234yf in these uses.

HFO-1234yf Based Heat Transfer Compositions Containing α-terpinene

In a second aspect, the present invention provides a heat transfer composition comprising or consisting essentially of or consisting of a composition of the first aspect of the invention.

The heat transfer composition may comprise, consist essentially of or consist of one or more other refrigerants besides HFO-1234yf, lubricants or other materials typically found in heat transfer compositions. Other refrigerants besides HFO-1234yf which may be present in the heat transfer composition include without limitation hydrocarbons (such as propane, butane or isobutane), $CO_2$, saturated HFCs (such as 134a, 152a, 227ea, 32, 125, $CF_3I$), and HFOs (such as 1234ze, 1233zd, 1336mzzm) or combinations of these. The amounts of these other refrigerants may vary widely depending on the application. For example the other refrigerants may be present in an amount of from about 1 to about 99 weight % or from about 5 to about 95 weight % or from about 10 to about 90 weight % of the heat transfer composition.

The heat transfer compositions of the invention may contain one or more lubricants. When lubricant is included in the heat transfer composition it may be present in widely ranging amounts including for example in an amount of from about 5 to about 30 percent by weight of the heat transfer composition. Commonly used lubricants such as polyol esters (POEs) and poly alkylene glycols (PAGs), poly vinyl ethers, silicone oil, mineral oil, alkyl benzenes (ABs) and poly(alpha-olefin) (PAO) may be used with the compositions of the present invention.

The heat transfer compositions of the invention may be used in automotive air conditioning systems and devices, commercial refrigeration systems and devices, chillers, residential refrigerator and freezers, general air conditioning systems, heat pumps, and the like. The presence of α-terpinene in the compositions of the invention does not detract from the environmentally desirable properties or from the performance of HFO-1234yf in these uses.

In accordance with a third aspect of the present invention, there is provided the use of a HFO-1234yf and α-terpinene composition as defined in the first aspect of the invention as a refrigerant including in a heat transfer composition.

Use as Inhibitor and Method of Inhibition

In a fourth aspect, the present invention relates to the use of an additive to inhibit the formation of HFO-1234yf polymerization products comprising combining α-terpinene and HFO-1234yf to produce a composition comprising HFO-1234yf and α-terpinene. In a fifth aspect, the invention relates to a method of inhibiting the formation of HFO-1234yf polymerization products in a fluid comprising, consisting essentially of or consisting of HFO-1234yf comprising combining α-terpinene and the fluid to produce a composition comprising HFO-1234yf and α-terpinene. The present invention includes methods and uses which combine α-terpinene and HFO-1234yf in amounts effective to meet any one of and/or each of the NVR limitations and ranges defined under the heading NVR Criteria discussed above.

In each of the fourth and fifth aspects of the invention, the α-terpinene is present in an amount of at least about 1 ppm by weight based on the amount of HFO-1234yf and the α-terpinene present in the composition. Specifically the α-terpinene is present in an amount of from about 1 ppm to about 10,000 ppm by weight or from about 100 ppm to about 1000 ppm by weight or from about 150 ppm to about 500 ppm by weight or from about 300 ppm to about 500 ppm present in the composition, in each case based on the amount of HFO-1234yf and the α-terpinene present in the composition.

In preferred embodiments of each of the fourth and fifth aspects of the invention, the α-terpinene is present in an amount of from about 150 ppm to about 500 ppm and the NVR of HFO-1234yf is less than 10 ppm, or the α-terpinene is present in an amount of from about 300 ppm to about 500 ppm and the NVR of HFO-1234yf is from about 5 to about 10 ppm or the α-terpinene is present after storage in a container or vessel at a temperature in the range of from about −10° C. to about 50° C. over any one or more of the following periods: 30 days, 3 months, 6 months.

The invention further provides a container comprising a composition comprising, consisting essentially of or consisting of HFO-1234yf and α-terpinene according to the present invention, including particularly in amounts effective to meet any one of and/or each of the NVR limitations and ranges defined under the heading NVR Criteria discussed above. Preferably, the container is fitted with a threaded valve and wherein the sealant on the threaded valve contains a peroxide, preferably cumene hydroperoxide. Preferably the cumene hydroperoxide comprises 1 to 5 weight percent of the sealant.

The HFO-1234yf in said container preferably has a NVR of less than 0.01 weight percent (100 ppm), or has a NVR of less than or equal to 25 ppm, or has a NVR of less than or equal to 15 ppm, or has a NVR of less than or equal to 10 ppm, or has a NVR of less than or equal to 5 ppm or the HFO-1234yf in said container has a NVR of from about 5 ppm to 15 ppm, or has a NVR of from about 5 ppm to 10 ppm or has a NVR of less than 10 ppm, in each case after storage for at least 30 days at a temperature of in the range of from about −10° C. to about 50° C. or after storage for at least 3 months at a temperature in the range of from about −10° C. to about 50° C. or after storage for at least 6 months at a temperature in the range of from about −10° C. to about 50° C.

The HFO-1234yf in said container preferably has a NVR of less than 0.01 weight percent (100 ppm), or has a NVR of less than or equal to 25 ppm, or has a NVR of less than or equal to 15 ppm, or has a NVR of less than or equal to 10 ppm, or has a NVR of less than or equal to 5 ppm or the HFO-1234yf in said container has a NVR of from about 5 ppm to 15 ppm, or has a NVR of from about 5 ppm to 10 ppm, or has a NVR of less than 10 ppm, in each case after storage for at least 30 days at a temperature of about −10° C. to about 50° C. or after storage for at least 3 months at a temperature about −10° C. to about 50° C. or after storage for at least 6 months at a temperature of about −10° C.

In order to help with the understanding of the technology of the present invention, please refer to the following examples which are intended to be illustrative of the technology, but are not intended to limit the scope of the technology.

The effectiveness of various additives was determined experimentally by measuring the amount of degradation products by weight using gravimetric measurement and confirming their structure by NMR or SEM spectroscopy. Based on this testing, we have discovered that polymerization of HFO-1234yf can be substantially reduced or eliminated through the use of α-terpinene in accordance with the amounts and conditions as described herein.

HFO-1234yf (2,3,3,3-tetrafluoropropene) may be prepared by any means known in the art. See for example the process disclosed in EP 1968922 A2. HFO-1234yf should meet AHRI Standard 700-2017 with Addendum 1, Specification for Refrigerants. HFO-1234yf is commercially available from Honeywell International Inc. as Solstice® 1234yf refrigerant.

α-terpinene is commercially available, for example, from Millipore-Sigma.

FIG. 1 shows the NMR spectra for the monomer of HFO-1234yf and homopolymer of HFO-1234yf. The −70 to −80 region is the chemical shift for the $CF_3$ group, the CF shift at −125 represents the CF in the monomer, and the shift at −170 to −180 represents the CF group in the polymer. The monomer and polymer are distinct and it is easy to detect the formation of a homopolymer of HFO-1234yf when the additive fails in suppressing the reaction.

In the Examples, NVR means the value as determined by The NVR Test method. In the Examples, successfully meeting the NVR specification of HFO-1234yf means an NVR maximum of 0.01 weight % (100 ppm).

In the Examples, initiator means peroxide or thread sealant containing cumene hydroperoxide.

Control 1: Control 1 describes the preparation of a polymer of HFO-1234yf produced through the reaction of HFO-1234yf of >99.5% purity. For each of the Control, Examples, and Comparative Examples HFO-1234yf of >99.5% purity was used.

A free radical was generated by thermal bond cleavage by heating t-butylperoxypivalate (a peroxide) to 56–60° C. This serves as the base line for the quantity of polymer that can be generated under the conditions of the experiment. 2,3,3,3-Tetrafluoropropene (245 g, 2.15 mol) was added to an evacuated 1 L Hastelloy autoclave. The initiator, t-butylperoxypivalate (0.47 g of a 70 wt % solution, 1343 ppm), was added in one portion. The temperature of the Hastelloy autoclave was raised to 58° C.±2° C. over a 0.5 hour period with agitation. The reaction was continued for 24 hours. Upon cooling and removal of the unreacted HFO-1234yf, 42.9 g (~17% yield) of the homo polymer of HFO-1234yf was recovered having a molecular weight of 27.8K Daltons by GPC and a poly dispersity of 1.7. No additive was used in this Control.

Control 2: Control 1 was repeated to establish a base line for polymer formation using an approximate ten-fold decrease in the amount of radical initiator (100 ppm) compared to Control 1. The equipment and reaction conditions described above were used with the following quantities of reactants: HFO-1234yf (249 g, 2.18 mol) and t-butylperoxypivalate (0.036 g of a 70 wt % solution, 101 ppm of active initiator). At the completion of the reaction, the formed homo polymer of HFO-1234yf (6.6 g, (~3% yield)) was isolated. No additive was used in this Control.

Control 3: Control 1 was repeated to serve as a baseline value using an approximate one hundred-fold decrease in the amount of radical initiator of only 10 ppm of initiator compared to Control 1 and extending the reaction time to seven days. The following reagents and values were charged into the autoclave. HFO-1234yf (243.1 g, 2.13 mol), t-butylperoxypivalate (0.0036 g of a 70 wt % solution, 10 ppm). Upon completion of the reaction, the formed polymer of HFO-1234yf was isolated (0.6425 gram, 0.26% yield). No additive was used in this Control.

The Examples of the invention used the same equipment and reaction conditions as Control 1 except that an additive was added and t-butylperoxypivalate in a 70 wt. solution was used as the initiator.

In Comparative Examples A, B, C, E, F, H, and I, the same equipment and reaction conditions as Control 1 were used and various terpenes outside the scope of the invention were used as the additive. In Comparative Example D, isobutylene was used as the additive and in example G, 1,4-hydroquinone, a known phenol stabilizer for preventing the decomposition of lubricants and refrigerants, was used as the additive. The reaction conditions for Comparatives D and G were the same as Control 1.

The results of the Controls, Comparative Examples and Examples of the invention are reported in the following Table 1.

TABLE 1

| | | | | Peroxide as Initiator | | |
|---|---|---|---|---|---|---|
| Control/EX. | HFO-1234yf | INITIATOR | REACTION TIME (days) | ADDITIVE | OBSERVATIONS | MET NVR of HFO-1234yf |
| Ctrl 1 | 245 g (2.15 mol) | Peroxide (0.47 g, 1343 ppm) | 1 | None | 42.9 g of polymerization products formed. | No |
| Ctrl 2 | 249 g (2.18 mol) | Peroxide (0.036 g, 101 ppm) | 1 | None | 6.6 g of polymerization products formed. | No |
| Ctrl 3 | 243.1 g (2.13 mol) | Peroxide (0.0036 g, 10 ppm) | 7 | None | 0.6425 g of polymerization products formed. | No |
| A | 246.8 g, 2.16 moles | Peroxide (0.036 g, 102 ppm) | 1 | d-limonene (0.24 g, 972 ppm) | 0.15 g of polymerization products formed. | No NVR = 608 ppm |
| B | 240 g, 2.1 moles | Peroxide (0.34 g, 992 ppm) | 1 | d-limonene (0.24 g, 1000 ppm) | 4.6 g of degradation products formed. | No |
| C | 254.6 g, 2.23 moles | Peroxide (0.036 g, 98.9 ppm) | 1 | Farnesene (0.24 g, 943 ppm) | 0.451 g of polymerization products formed. | No |
| D | 240.5 g, 2.11 moles | Peroxide (0.036 g, 105 ppm) | 1 | Isobutylene (0.24 g, 998 ppm) | 2.0 g of polymerization products formed | No |
| E | 254.0 g, 2.23 moles | Peroxide (0.048 g, 132 ppm) | 1 | Isoprene (0.12 g, 472 ppm) | 0.034 g of polymerization products formed | No NVR = 134 ppm |
| F | 255.6 g, 2.24 moles | Peroxide (0.033 g, 90 ppm) | 1 | Myrcene (0.11 g, 430 ppm) | 0.12 g of polymerization products formed. | No NVR = 470 ppm |
| G | 258.8 g, 2.27 moles | Peroxide (0.036 g, 95 ppm) | 1 | 1,4-hydroquinone (0.125 g, 483 ppm) | 0.86 g of polymerization products formed. | No |
| H | 251.6 g (2.21 moles) | Peroxide (0.34 g, 1000 ppm) | 7 | α- pinene (0.24 g, 1000 pm) | 16.8 g of polymerization products formed. | No |
| I | 251.6 g (2.21 moles) | Peroxide (0.17 g, 500 ppm) | 5 | Δ-terpinene (terpinolene) (0.126 g, 500 ppm) | 0.038 g of polymerization products formed. | No NVR = 150 ppm |
| Ex. 1 | 251.1 g (2.2 moles) | Peroxide (0.0036 g, 10 ppm) | 7 | α-terpinene (0.0125 g, 50 ppm) | | Yes NVR <= 5 ppm |
| Ex. 2 | 248.3 g | Peroxide (0.077 g, 216 ppm) | 7 | α-terpinene (0.075 g, 300 ppm) | | Yes NVR = 8 ppm |
| Ex. 3 | 248.3 g | Peroxide (0.077 g, 216 ppm) | 7 | α-terpinene (0.125 g, 500 ppm) | | Yes NVR = 6 ppm |

Control 4: Control 1 was repeated except that the initiator was thread sealant instead of peroxide, the amount of HFO-1234yf was 500 g, the reaction time was 30 days, and the reaction temperature was about 20° C. No stabilizer was used in this Control.

Comparative Examples J and K used the same conditions as Control 4 and various terpenes outside the scope of the invention were used as the stabilizer.

Examples 4 and 5 used the same conditions as Control 4 except α-terpinene in an amount of 500 ppm or 300 ppm respectively was added as inhibitor.

The results of Control 4, Comparative Examples J and K, and Examples 4 and 5 of the invention are reported in the following Table 2.

TABLE 2

Thread Sealant as Initiator

| Control/EX. | HFO-1234yf | INITIATOR | REACTION TIME (days) | ADDITIVE | OBSERVATIONS | MET NVR of HFO-1234yf |
|---|---|---|---|---|---|---|
| Ctrl 4 | 500 g | Thread sealant (10 g) | 30 | None | 0.10 g of polymerization products formed. | No NVR = 200 ppm |
| J | 500 g | Thread sealant (do g) | 30 | a- pinene (0.25 g, 500 ppm | 8.2 g of polymerization products formed. | No |
| K | 500 g | Thread sealant (10 g) | 30 | Δ-terpinene (terpinolene) (0.25 g, 500 ppm) | 0.215 g of polymerization products formed. | No NVR = 430 ppm |
| Ex. 4 | 500 g | Thread sealant (10 g) | 30 | a-terpinene (0.25 g, 500 ppm) | | Yes NVR <= 10 ppm |
| Ex. 5 | 500 g | Thread sealant (10 g) | 30 | a-terpinene (0.15 g, 300 ppm) | | Yes NVR <= 10 ppm |

The experimental work summarized in Tables 1 and 2 shows that while various branched alkyl, cyclic, and bridged bicyclic organic compounds, exhibiting one to four equivalents of unsaturation, conjugated and/or unconjugated, were tested for efficacy in reducing the polymerization of HFO-1234yf when it is exposed to peroxide, only one such organic compound, α-terpinene, showed that it reduced the amount of polymer generated to <100 ppm, therefore maintaining an acceptable NVR level per the specification of AHRI Standard 700.

NUMBERED EMBODIMENTS

The invention will now be illustrated by reference to the following numbered embodiments. The subject matter of the numbered embodiments may be additionally combined with subject matter from the description or from one or more of the claims.

Numbered Embodiment 1

A composition comprising HFO-1234yf and α-terpinene.

Numbered Embodiment 2

The composition of Numbered Embodiment 1 wherein the composition consists essentially of HFO-1234yf and α-terpinene.

Numbered Embodiment 3

The composition of Numbered Embodiment 1 wherein the composition consists of HFO-1234yf and α-terpinene.

Numbered Embodiment 4

The composition of any one of Numbered Embodiments 1 to 3 wherein the α-terpinene is present in an amount of at least about 1 ppm weight-based on the amount of HFO-1234yf and α-terpinene present in the composition.

Numbered Embodiment 5

The composition of any one of Numbered Embodiments 1 to 4 wherein the α-terpinene is present in an amount of-from about 1 ppm to about 10,000 ppm based on the amount of HFO-1234yf and α-terpinene present in the composition.

Numbered Embodiment 6

The composition of any one of Numbered Embodiments 1 to 4 wherein the α-terpinene is present in an amount of from about 100 ppm to about 1000 ppm percent by weight based on the amount of HFO-1234yf and α-terpinene present in the composition.

Numbered Embodiment 7

The composition of any one of Numbered Embodiment 1 to 4 wherein the α-terpinene is present in an amount of from about 150 ppm to about 500 ppm based on the amount of HFO-1234yf and α-terpinene present in the composition.

Numbered Embodiment 8

The composition of any one of Numbered Embodiment 1 to 4 wherein the α-terpinene is present in an amount of from about 300 ppm to about 500 ppm based on the amount of HFO-1234yf and α-terpinene present in the composition.

Numbered Embodiment 9

The composition of any one of Numbered Embodiments 1 to 8 wherein the Non-Volatile Residue (NVR) of the HFO-1234yf is less than 0.01 weight percent (100 ppm).

Numbered Embodiment 10

The composition of any one of Numbered Embodiments 1 to 9, wherein the Non-Volatile Residue (NVR) of the HFO-1234yf is less than or equal to 25 ppm.

Numbered Embodiment 11

The composition of any one of Numbered Embodiments 1 to 10, wherein the Non-Volatile Residue (NVR) of the HFO-1234yf is less than or equal to 15 ppm.

Numbered Embodiment 12

The composition of any one of Numbered Embodiments 1 to 11, wherein the Non-Volatile Residue (NVR) of the HFO-1234yf is less than or equal to 10 ppm.

Numbered Embodiment 13

The composition of any one of Numbered Embodiments 1 to 12, wherein the Non-Volatile Residue (NVR) of the HFO-1234yf is less than or equal to 5 ppm.

Numbered Embodiment 14

The composition of any one of Numbered Embodiments 1 to 13, wherein the Non-Volatile Residue (NVR) of the HFO-1234yf is from about 5 ppm to 15 ppm.

Numbered Embodiment 16

The composition of any one of Numbered Embodiments 1 to 14, wherein the Non-Volatile Residue (NVR) of the HFO-1234yf is from about 5 ppm to 10 ppm.

Numbered Embodiment 17

The composition of any one of Numbered Embodiments 1 to 15, wherein the Non-Volatile Residue (NVR) of the HFO-1234yf is less than 10 ppm.

Numbered Embodiment 18

The composition of any one of Numbered Embodiments 1 to 17, wherein the Non-Volatile Residue (NVR) of the HFO-1234yf does not exceed 0.01 weight % (100 ppm) after storage for a period of at least 30 days.

Numbered Embodiment 19

The composition of any one of Numbered Embodiments 1 to 18, wherein the Non-Volatile Residue (NVR) of the HFO-1234yf does not exceed 0.01 weight % (100 ppm) after storage for a period of at least 3 months.

Numbered Embodiment 20

The composition of any one of Numbered Embodiments 1 to 19, wherein the Non-Volatile Residue (NVR) of the HFO-1234yf does not exceed 0.01 weight % (100 ppm) after storage for a period of at least 6 months.

Numbered Embodiment 21

The composition of any one of Numbered Embodiments 1 to 20, wherein the Non-Volatile Residue (NVR) of the HFO-1234yf is less than or equal to 25 ppm after storage for a period of at least 30 days.

Numbered Embodiment 22

The composition of any one of Numbered Embodiments 1 to 21, wherein the Non-Volatile Residue (NVR) of the HFO-1234yf is less than or equal to 25 ppm after storage for a period of at least 3 months.

Numbered Embodiment 23

The composition of any one of Numbered Embodiments 1 to 22, wherein the Non-Volatile Residue (NVR) of the HFO-1234yf is less than or equal to 25 ppm after storage for a period of at least 6 months.

Numbered Embodiment 24

The composition of any one of Numbered Embodiments 1 to 23, wherein the Non-Volatile Residue (NVR) of the HFO-1234yf is less than or equal to 15 ppm after storage for a period of at least 30 days.

Numbered Embodiment 25

The composition of any one of Numbered Embodiments 1 to 24, wherein the Non-Volatile Residue (NVR) of the HFO-1234yf is less than or equal to 15 ppm after storage for a period of at least 3 months.

Numbered Embodiment 26

The composition of any one of Numbered Embodiments 1 to 25, wherein the Non-Volatile Residue (NVR) of the HFO-1234yf is less than or equal to 15 ppm after storage for a period of at least 6 months.

Numbered Embodiment 27

The composition of any one of Numbered Embodiments 1 to 26 wherein the Non-Volatile Residue (NVR) of the HFO-1234yf is less than or equal to 10 ppm after storage for a period of at least 30 days.

Numbered Embodiment 28

The composition of any one of Numbered Embodiments 1 to 27, wherein the Non-Volatile Residue (NVR) of the HFO-1234yf is less than or equal to 10 ppm after storage for a period of at least 3 months.

Numbered Embodiment 29

The composition of any one of Numbered Embodiments 1 to 28, wherein the Non-Volatile Residue (NVR) of the HFO-1234yf is less than or equal to 10 ppm after storage for a period of at least 6 months.

Numbered Embodiment 30

The composition of any one of Numbered Embodiments 1 to 29, wherein the Non-Volatile Residue (NVR) of the HFO-1234yf is less than or equal to 5 ppm after storage for a period of at least 30 days.

Numbered Embodiment 31

The composition of any one of Numbered Embodiments 1 to 30, wherein the Non-Volatile Residue (NVR) of the HFO-1234yf is less than or equal to 5 ppm after storage for a period of at least 3 months.

Numbered Embodiment 32

The composition of any one of Numbered Embodiments 1 to 31, wherein the Non-Volatile Residue (NVR) of the HFO-1234yf is less than or equal to 5 ppm after storage for a period of at least 6 months.

Numbered Embodiment 33

The composition of any one of Numbered Embodiments 1 to 32, wherein the Non-Volatile Residue (NVR) of the HFO-1234yf is from about 5 ppm to 15 ppm after storage for a period of at least 30 days.

Numbered Embodiment 34

The composition of any one of Numbered Embodiments 1 to 33, wherein the Non-Volatile Residue (NVR) of the HFO-1234yf is from about 5 ppm to 15 ppm after storage for a period of at least 3 months.

Numbered Embodiment 35

The composition of any one of Numbered Embodiments 1 to 34, wherein the Non-Volatile Residue (NVR) of the HFO-1234yf is from about 5 ppm to 15 ppm after storage for a period of at least 6 months.

Numbered Embodiment 36

The composition of any one of Numbered Embodiments 1 to 35, wherein the Non-Volatile Residue (NVR) of the HFO-1234yf is from about 5 ppm to 10 ppm after storage for a period of at least 30 days.

Numbered Embodiment 37

The composition of any one of Numbered Embodiments 1 to 36, wherein the Non-Volatile Residue (NVR) of the HFO-1234yf is from about 5 ppm to 10 ppm after storage for a period of at least 3 months.

Numbered Embodiment 38

The composition of any one of Numbered Embodiments 1 to 37, wherein the Non-Volatile Residue (NVR) of the HFO-1234yf is from about 5 ppm to 10 ppm after storage for a period of at least 6 months.

Numbered Embodiment 39

The composition of any one of Numbered Embodiments 1 to 38, wherein the Non-Volatile Residue (NVR) of the HFO-1234yf is less than 10 ppm after storage for a period of at least 30 days.

Numbered Embodiment 40

The composition of any one of Numbered Embodiments 1 to 39 wherein the Non-Volatile Residue (NVR) of the HFO-1234yf is less than 10 ppm after storage for a period of at least 3 months.

Numbered Embodiment 41

The composition of any one of Numbered Embodiments 1 to 40, wherein the Non-Volatile Residue (NVR) of the HFO-1234yf is less than 10 ppm after storage for a period of at least 6 months.

Numbered Embodiment 42

The use of a composition of any one of Numbered Embodiments 1 to 41 in automotive air conditioning systems and devices, commercial refrigeration systems and devices, chillers, residential refrigerator and freezers, general air conditioning systems, or heat pumps.

Numbered Embodiment 43

The use of a composition of any one of Numbered Embodiments 1 to 41 as foam blowing agents and/or propellants.

Numbered Embodiment 44

A heat transfer composition comprising a composition of any one of Numbered Embodiments 1 to 41.

Numbered Embodiment 45

The heat transfer composition of Numbered Embodiment 44, wherein the heat transfer compositions comprises one or more additional refrigerant.

Numbered Embodiment 46

The heat transfer composition of Numbered Embodiment 45 wherein the heat transfer composition consists essentially of HFO-1234yf, α-terpinene and one or more additional refrigerants.

Numbered Embodiment 47

The heat transfer composition of Numbered Embodiment 45 wherein the heat transfer composition consists of HFO-1234yf, α-terpinene and one or more additional refrigerants.

Numbered Embodiment 48

The heat transfer composition of any one of Numbered Embodiment 45 to 47 wherein the one or more additional refrigerants are selected from hydrocarbons (such as propane, butane or isobutane), $CO_2$, saturated HFCs (such as 134a, 152a, 227ea, 32, 125, CF3I), and HFOs (such as 1234ze, 1233zd, 1336 mzzm) or combinations of these.

Numbered Embodiment 49

The heat transfer composition of any one of Numbered Embodiments 45 to 48, wherein the additional refrigerant is present in the heat transfer composition in an amount of from about 1 to about 99 weight % of the heat transfer composition.

Numbered Embodiment 50

The heat transfer composition of any one of Numbered Embodiments 45 to 48, wherein the additional refrigerant is present in the heat transfer composition in an amount of from about 5 to about 95 weight % of the heat transfer composition.

Numbered Embodiment 51

The heat transfer composition of any one of Numbered Embodiments 45 to 48, wherein the additional refrigerant is present in the heat transfer composition in an amount of from about 10 to about 90 weight % of the heat transfer composition.

Numbered Embodiment 52

The heat transfer composition of Numbered Embodiment 44 to 45 and 48 to 51 where the heat transfer composition further comprises a lubricant.

Numbered Embodiment 53

The heat transfer composition of Numbered Embodiment 52 wherein the heat transfer composition consists essentially of HFO-1234yf, α-terpinene, one or more additional refrigerants and a lubricant.

Numbered Embodiment 54

The heat transfer composition of Numbered Embodiment 52 wherein the heat transfer composition consists of HFO-1234yf, α-terpinene, one or more additional refrigerants and a lubricant

Numbered Embodiment 55

The heat transfer composition of Numbered Embodiment 52 to 54 wherein the lubricant is present in an amount of from 5 to about 30 percent by weight of the heat transfer composition.

Numbered Embodiment 56

The heat transfer composition of Numbered Embodiment 52 to 55, wherein the lubricant is selected from polyol esters (POEs) and poly alkylene glycols (PAGs), poly vinyl ethers, silicone oil, mineral oil, alkyl benzenes (ABs) and poly (alpha-olefin) (PAO).

Numbered Embodiment 57

The use of a heat transfer composition of Numbered Embodiments 43 to 56, in automotive air conditioning systems and devices, commercial refrigeration systems and devices, chillers, residential refrigerator and freezers, general air conditioning systems, heat pumps, and the like.

Numbered Embodiment 58

Use of a composition of Numbered Embodiments 1 to 41 as a refrigerant.

Numbered Embodiment 59

Use of a composition of Numbered Embodiments 1 to 41, in a heat transfer composition.

Numbered Embodiment 60

Use of α-terpinene to inhibit the formation of a HFO-1234yf polymerization product, wherein α-terpinene is added to HFO-1234yf to produce a composition of any one of Numbered Embodiments 1 to 41.

Numbered Embodiment 61

The use of Numbered Embodiment 60, where the α-terpinene is added in an amount of at least about 1 ppm by weight based on the amount of HFO-1234yf and α-terpinene.

Numbered Embodiment 62

The use of Numbered Embodiment 60, where the α-terpinene is added in an amount of from about 1 ppm to about 10,000 ppm by weight based on the amount of HFO-1234yf and α-terpinene.

Numbered Embodiment 63

The use of Numbered Embodiment 60, where the α-terpinene is added in an amount of from about 100 ppm to about 1000 ppm percent by weight based on the amount of HFO-1234yf and α-terpinene.

Numbered Embodiment 64

The use of Numbered Embodiment 60, where the α-terpinene is added in an amount of from about 150 ppm to about 500 ppm by weight based on the amount of HFO-1234yf and α-terpinene.

Numbered Embodiment 65

The use of Numbered Embodiment 60, where the α-terpinene is added in an amount of from about 300 to about 500 weight in each case based on the amount of HFO-1234yf and α-terpinene.

Numbered Embodiment 66

The use of Numbered Embodiment 60 wherein the α-terpinene is added in an amount of from about 150 ppm to about 500 ppm percent by weight based on the amount of HFO-1234yf and α-terpinene and the NVR of HFO-1234yf is less than 10 ppm after storage for a period of at least 30 days.

Numbered Embodiment 67

The use of Numbered Embodiment 60 wherein the α-terpinene is added in an amount of from about 150 ppm to about 500 ppm by weight based on the amount of HFO-1234yf and α-terpinene and the NVR of HFO-1234yf is less than 10 ppm after storage for a period of at least 3 months.

Numbered Embodiment 68

The use of Numbered Embodiment 60 wherein the α-terpinene is added in an amount of from about 150 ppm to about 0.05 ppm by weight based on the amount of HFO-1234yf and α-terpinene and the NVR of HFO-1234yf is less than 10 ppm after storage for a period of at least 6 months.

Numbered Embodiment 69

The use of Numbered Embodiment 60, wherein the α-terpinene is added in an amount of from about 300 to about 500 percent by weight based on the amount of HFO-1234yf and α-terpinene and the NVR of HFO-1234yf is from about 5 to about 10 ppm after storage for a period of at least 30 days.

Numbered Embodiment 70

The use of Numbered Embodiment 60, wherein the α-terpinene is added in an amount of from about 300 to about 500 percent by weight based on the amount of HFO-1234yf and α-terpinene and the NVR of HFO-1234yf is from about 5 to about 10 ppm after storage for a period of at least 3 months.

Numbered Embodiment 71

The use of Numbered Embodiment 60, wherein the α-terpinene is added in an amount of from about 300 to about 500 percent by weight based on the amount of HFO-1234yf and α-terpinene and the NVR of HFO-1234yf is from about 5 to about 10 ppm after storage for a period of at least 6 months.

Numbered Embodiment 72

The use of Numbered Embodiment 60, wherein the α-terpinene is added in an amount of from about 150 ppm to about 500 percent by weight based on the amount of HFO-1234yf and α-terpinene and the NVR of HFO-1234yf is less than 10 ppm after storage for a period of at least 30 days.

Numbered Embodiment 73

The use of Numbered Embodiment 60, wherein the α-terpinene is added in an amount of from about 150 ppm to about 500 percent by weight based on the amount of HFO-1234yf and α-terpinene and the NVR of HFO-1234yf is less than 10 ppm after storage for a period of at least 3 months.

Numbered Embodiment 74

The use of Numbered Embodiment 60, wherein the α-terpinene is added in an amount of from about 150 ppm to about 500 by weight based on the amount of HFO-1234yf and α-terpinene and the NVR of HFO-1234yf is less than 10 ppm after storage for a period of at least 6 months.

Numbered Embodiment 75

The use of Numbered Embodiment 60, wherein the α-terpinene is added in an amount of from about 300 to about 500 by weight based on the amount of HFO-1234yf and α-terpinene and the NVR of HFO-1234yf is from about 5 to about 10 ppm after storage for a period of at least 30 days.

Numbered Embodiment 76

The use of Numbered Embodiment 60, wherein the α-terpinene is added in an amount of from about 300 to about 500 percent by weight based on the amount of HFO-1234yf and α-terpinene and the NVR of HFO-1234yf is from about 5 to about 10 ppm after storage for a period of at least 3 months.

Numbered Embodiment 77

The use of Numbered Embodiment 60, wherein the α-terpinene is added in an amount of from about 300 ppm to about 500 ppm by weight based on the amount of HFO-1234yf and α-terpinene and the NVR of HFO-1234yf is from about 5 to about 10 ppm after storage for a period of at least 6 months.

Numbered Embodiment 78

A method of inhibiting the formation of HFO-1234yf polymerization products, said method comprising adding α-terpinene to HFO-1234yf to produce a composition of any one of Numbered Embodiments 1 to 41.

Numbered Embodiment 79

The method of Numbered Embodiment 78 where the α-terpinene is added in an amount of at least about 1 ppm by weight based on the amount of HFO-1234yf and α-terpinene.

Numbered Embodiment 80

The method of Numbered Embodiment 78, where the α-terpinene is added in an amount of from about 1 ppm to about 10,000 ppm by weight based on the amount of HFO-1234yf and α-terpinene.

Numbered Embodiment 81

The method of Numbered Embodiment 78 where the α-terpinene is added in an amount of from about 100 ppm to about 1000 ppm by weight based on the amount of HFO-1234yf and α-terpinene.

Numbered Embodiment 82

The method of Numbered Embodiment 78, where the α-terpinene is added in an amount of from about 150 ppm to about 500 by weight based on the amount of HFO-1234yf and α-terpinene.

Numbered Embodiment 83

The method of Numbered Embodiment 78, where the α-terpinene is added in an amount of from about 300 ppm to about 500 ppm weight based on the amount of HFO-1234yf and α-terpinene in each case based on the amount of HFO-1234yf and α-terpinene.

Numbered Embodiment 84

The method of Numbered Embodiment 78 wherein the α-terpinene is added in an amount of from about 150 ppm to about 500 by weight based on the amount of HFO-1234yf and α-terpinene and the NVR of HFO-1234yf is less than 10 ppm after storage for a period of at least 30 days.

Numbered Embodiment 85

The method of Numbered Embodiment 78 wherein the α-terpinene is added in an amount of from about 150 ppm to about 500 ppm by weight based on the amount of HFO-1234yf and α-terpinene and the NVR of HFO-1234yf is less than 10 ppm after storage for a period of at least 3 months.

Numbered Embodiment 86

The method of Numbered Embodiment 78 wherein the α-terpinene is added in an amount of from about 0.015 to about 0.05 percent by weight based on the amount of HFO-1234yf and α-terpinene and the NVR of HFO-1234yf is less than 10 ppm after storage for a period of at least 6 months.

Numbered Embodiment 87

The method of Numbered Embodiment 78, wherein the α-terpinene is added in an amount of from about 300 ppm to about 500 ppm by weight based on the amount of HFO-1234yf and α-terpinene and the NVR of HFO-1234yf is from about 5 to about 10 ppm after storage for a period of at least 30 days.

Numbered Embodiment 88

The method of Numbered Embodiment 78, wherein the α-terpinene is added in an amount of from about 300 ppm to about 500 ppm by weight based on the amount of HFO-1234yf and α-terpinene and the NVR of HFO-1234yf is from about 5 to about 10 ppm after storage for a period of at least 3 months.

Numbered Embodiment 89

The method of Numbered Embodiment 78, wherein the α-terpinene is added in an amount of from about 300 ppm to about 500 ppm by weight based on the amount of HFO-1234yf and α-terpinene and the NVR of HFO-1234yf is from about 5 to about 10 ppm after storage for a period of at least 6 months.

Numbered Embodiment 90

The method of Numbered Embodiment 78, wherein the α-terpinene is added in an amount of from about 150 ppm to about 500 ppm by weight based on the amount of HFO-1234yf and α-terpinene and the NVR of HFO-1234yf is less than 10 ppm after storage for a period of at least 30 days.

Numbered Embodiment 91

The method of Numbered Embodiment 78, wherein the α-terpinene is added in an amount of from about 150 ppm to about 500 ppm percent by weight based on the amount of HFO-1234yf and α-terpinene and the NVR of HFO-1234yf is less than 10 ppm after storage for a period of at least 3 months.

Numbered Embodiment 92

The method of Numbered Embodiment 78, wherein the α-terpinene is added in an amount of from about 150 ppm to about 500 ppm by weight based on the amount of HFO-1234yf and α-terpinene and the NVR of HFO-1234yf is less than 10 ppm after storage for a period of at least 6 months.

Numbered Embodiment 93

The method of Numbered Embodiment 78, wherein the α-terpinene is added in an amount of from about 0.03 to about 0.05 percent by weight based on the amount of HFO-1234yf and α-terpinene and the NVR of HFO-1234yf is from about 5 to about 10 ppm after storage for a period of at least 30 days.

Numbered Embodiment 94

The method of Numbered Embodiment 78, wherein the α-terpinene is added in an amount of from about 300 ppm to about 500 by weight based on the amount of HFO-1234yf and α-terpinene and the NVR of HFO-1234yf is from about 5 to about 10 ppm after storage for a period of at least 3 months.

Numbered Embodiment 95

The method of Numbered Embodiment 78, wherein the α-terpinene is added in an amount of from about 300 ppm to about 500 ppm by weight based on the amount of HFO-1234yf and α-terpinene and the NVR of HFO-1234yf is from about 5 to about 10 ppm after storage for a period of at least 6 months.

Numbered Embodiment 96

A container containing a composition of any one of Numbered Embodiments 1 to 41, wherein said container is fitted with a threaded valve and wherein the sealant on the threaded valve contains a peroxide.

Numbered Embodiment 97

The container of Numbered Embodiment 96, wherein the sealant comprises cumene hydroperoxide.

Numbered Embodiment 98

The container of Numbered Embodiment 97 wherein the sealant comprises from 1 to 5 weight percent of cumene hydroperoxide.

Numbered Embodiment 99

A container containing a heat transfer composition of any one of Numbered Embodiments 44 to 56, wherein said container is fitted with a threaded valve and wherein the sealant on the threaded valve contains a peroxide.

Numbered Embodiment 100

The container of Numbered Embodiment 99, wherein the sealant comprises cumene hydroperoxide.

Numbered Embodiment 101

The container of Numbered Embodiment 100 wherein the sealant comprises from 1 to 5 weight percent of cumene hydroperoxide.

Numbered Embodiment 102

The container of any one of Numbered Embodiment 96 to 101, where the HFO-1234yf is stored in the container at a temperature in the range of from about −10° C. to about 50° C.

Numbered Embodiment 103

The container of any one of Numbered Embodiment 96 to 102 where the HFO-1234yf in the container has a NVR of less than 0.01 weight percent (100 ppm) after storage for at least 30 days at a temperature in the range of from about −10° C. to about 50° C.

Numbered Embodiment 104

The container of any one of Numbered Embodiment 96 to 102 where the HFO-1234yf in the container has a NVR of less than 0.01 weight percent (100 ppm) after storage for at least 3 months at a temperature in the range of from about −10° C. to about 50° C.

Numbered Embodiment 105

The container of any one of Numbered Embodiment 96 to 102 where the HFO-1234yf in the container has a NVR of less than 0.01 weight percent (100 ppm) after storage for at least 6 months at a temperature in the range of from about −10° C. to about 50° C.

Numbered Embodiment 106

The container of any one of Numbered Embodiment 96 to 102 where the HFO-1234yf in the container has a NVR of less than or equal to 25 ppm after storage for at least 30 days at a temperature in the range of from about −10° C. to about 50° C.

Numbered Embodiment 107

The container of any one of Numbered Embodiment 96 to 102 where the HFO-1234yf in the container has a NVR of less than or equal to 25 ppm after storage for at least 3 months at a temperature in the range of from about −10° C. to about 50° C.

Numbered Embodiment 108

The container of any one of Numbered Embodiment 96 to 102 where the HFO-1234yf in the container has a NVR of less than or equal to 25 ppm after storage for at least 6 months at a temperature in the range of from about −10° C. to about 50° C.

Numbered Embodiment 109

The container of any one of Numbered Embodiment 96 to 102 where the HFO-1234yf in the container has a NVR of less than or equal to 15 ppm after storage for at least 30 days at a temperature in the range of from about −10° C. to about 50° C.

Numbered Embodiment 110

The container of any one of Numbered Embodiment 96 to 102 where the HFO-1234yf in the container has a NVR of less than or equal to 15 ppm after storage for at least 3 months at a temperature in the range of from about −10° C. to about 50° C.

Numbered Embodiment 111

The container of any one of Numbered Embodiment 96 to 102 where the HFO-1234yf in the container has a NVR of less than or equal to 15 ppm after storage for at least 6 months at a temperature in the range of from about −10° C. to about 50° C.

Numbered Embodiment 112

The container of any one of Numbered Embodiment 96 to 102 where the HFO-1234yf in the container has a NVR of less than or equal to 10 ppm after storage for at least 30 days at a temperature in the range of from about −10° C. to about 50° C.

Numbered Embodiment 113

The container of any one of Numbered Embodiment 96 to 102 where the HFO-1234yf in the container has a NVR of less than or equal to 10 ppm after storage for at least 3 months at a temperature in the range of from about −10° C. to about 50° C.

Numbered Embodiment 114

The container of any one of Numbered Embodiment 96 to 102 where the HFO-1234yf in the container has a NVR of less than or equal to 10 ppm after storage for at least 6 months at a temperature in the range of from about −10° C. to about 50° C.

Numbered Embodiment 115

The container of any one of Numbered Embodiment 96 to 102 where the HFO-1234yf in the container has a NVR of less than or equal to 5 ppm after storage for at least 30 days at a temperature in the range of from about −10° C. to about 50° C.

Numbered Embodiment 116

The container of any one of Numbered Embodiment 96 to 102 where the HFO-1234yf in the container has a NVR of less than or equal to 5 ppm after storage for at least 3 months at a temperature in the range of from about −10° C. to about 50° C.

Numbered Embodiment 117

The container of any one of Numbered Embodiment 96 to 102 where the HFO-1234yf in the container has a NVR of less than or equal to 5 ppm after storage for at least 6 months at a temperature in the range of from about −10° C. to about 50° C.

Numbered Embodiment 118

The container of any one of Numbered Embodiment 96 to 102 where the HFO-1234yf in the container has a NVR of from about 5 ppm to 15 ppm after storage for at least 30 days at a temperature in the range of from about −10° C. to about 50° C.

Numbered Embodiment 119

The container of any one of Numbered Embodiment 96 to 102 where the HFO-1234yf in the container has a NVR of from about 5 ppm to 15 ppm after storage for at least 3 months at a temperature in the range of from about −10° C. to about 50° C.

Numbered Embodiment 120

The container of any one of Numbered Embodiment 96 to 102 where the HFO-1234yf in the container has a NVR of from about 5 ppm to 15 ppm after storage for at least 6 months at a temperature in the range of from about −10° C. to about 50° C.

Numbered Embodiment 121

The container of any one of Numbered Embodiment 96 to 102 where the HFO-1234yf in the container has a NVR of from about 5 ppm to 10 ppm after storage for at least 30 days at a temperature of in the range of from about −10° C. to about 50° C.

Numbered Embodiment 122

The container of any one of Numbered Embodiment 96 to 102 where the HFO-1234yf in the container has a NVR of from about 5 ppm to 10 ppm after storage for at least 3 months at a temperature of in the range of from about −10° C. to about 50° C.

Numbered Embodiment 123

The container of any one of Numbered Embodiment 96 to 102 where the HFO-1234yf in the container has a NVR of from about 5 ppm to 10 ppm after storage for at least 6 months at a temperature of up to 50° C.

Numbered Embodiment 124

The container of any one of Numbered Embodiment 96 to 102 where the HFO-1234yf in the container has a NVR of less than 10 ppm after storage for at least 30 days at a temperature of in the range of from about −10° C. to about 50° C.

Numbered Embodiment 125

The container of any one of Numbered Embodiment 96 to 102 where the HFO-1234yf in the container has a NVR of less than 10 ppm after storage for at least 3 months at a temperature in the range of from about −10° C. to about 50° C.

Numbered Embodiment 126

The container of any one of Numbered Embodiment 96 to 102 where the HFO-1234yf in the container has a NVR of less than 10 ppm after storage for at least 6 months at a temperature in the range of from about −10° C. to about 50° C.

Numbered Embodiment 127

The composition of any one of Numbered Embodiments 18 to 41, wherein said NVR values are achieved when the temperature of said composition is about −10° C. during said period of storage.

Numbered Embodiment 128

The composition of any one of Numbered Embodiments 18 to 41, wherein said NVR values are achieved when the temperature of said composition is about 50° C. during said period of storage.

Numbered Embodiment 129

The composition of any one of Numbered Embodiments 18 to 41, wherein said NVR values are achieved when said composition is at any temperature in the range of temperatures of from about −10° C. to about 50° C. during said period of storage.

The invention claimed is:

1. A composition that has been stored in a container at one or more temperatures in the range of temperatures of from about −10° C. to about 50° C. over a period of at least 30 days, said composition consisting essentially of HFO-1234yf and α-terpinene, and being in the presence of least one radical initiator contaminant, wherein after said storage period in the presence of said contaminant, said composition has an NVR of HFO-1234yf that is not greater than 0.01 weight % (100 ppm).

2. The composition of claim 1 wherein the composition consists of HFO-1234yf and α-terpinene.

3. The composition of claim 1 wherein the composition is exposed in the container to a radical initiator contaminant during said storage period and wherein said composition consists of HFO-1234yf and α-terpinene.

4. The composition of claim 1 wherein the α-terpinene is present in an amount of at least about 0.0001 percent by weight-based on the amount of HFO-1234yf and α-terpinene present in the composition.

5. The composition of claim 1 wherein the α-terpinene is present in an amount of from 0.0001 to about 1 percent by weight based on the amount of HFO-1234yf and α-terpinene present in the composition and wherein said composition has a Non-Volatile Residue (NVR) value less than 100 ppm after storage for a period of 30 days at a temperature of about −10° C.

6. A heat transfer composition consisting of a composition of claim 1.

7. The heat transfer composition of claim 1 consisting of said HFO-1234yf, at least one additional refrigerant and said α-terpinene.

8. A method of inhibiting the formation of HFO-1234yf polymerization products in the presence of least one radical initiator contaminant, said method comprising forming a refrigerant composition consisting essentially of at least one refrigerant and α-terpinene, wherein said at least one refrigerant contains said HFO-1234yf to produce a refrigerant composition having a NonVolatile Residue (NVR) of the HFO-1234yf less than 0.01 weight percent (100 ppm).

9. A closed storage container containing a refrigerant composition consisting essentially of: (a) at least one refrigerant containing HFO-1234yf; and (b) α-terpinene and having thereon a threaded valve with a cumene hydroperoxide containing sealant on the threaded valve.

* * * * *